US008996619B1

(12) United States Patent
McKnight et al.

(10) Patent No.: US 8,996,619 B1
(45) Date of Patent: Mar. 31, 2015

(54) APPARATUS, METHOD, AND COMPUTER PROGRAM FOR CONTROLLING A TARGET DEVICE USING INSTANT MESSAGES

(75) Inventors: David W. McKnight, Garland, TX (US); F. Randall Murray, II, McKinney, TX (US); Stephen R. Whynot, McKinney, TX (US)

(73) Assignee: Apple Inc., Cupertino, CA (US)

( * ) Notice: Subject to any disclaimer, the term of this patent is extended or adjusted under 35 U.S.C. 154(b) by 1287 days.

(21) Appl. No.: 10/814,358

(22) Filed: Mar. 31, 2004

(51) Int. Cl.
*G06F 15/16* (2006.01)
*G06F 21/30* (2013.01)

(52) U.S. Cl.
CPC ..................................... *G06F 21/30* (2013.01)
USPC ........................................... 709/206; 709/204

(58) Field of Classification Search
CPC ............ H04L 65/1006; H04L 12/1818; H04L 65/1033; H04M 3/56; H04W 4/20; H04Q 2213/1307
USPC .................. 709/204–206, 227–228, 230–231
See application file for complete search history.

(56) References Cited

U.S. PATENT DOCUMENTS

| 5,619,555 | A | * | 4/1997 | Fenton et al. ............... 379/88.11 |
| 5,710,591 | A | | 1/1998 | Bruno et al. |
| 5,812,653 | A | | 9/1998 | Jodoin et al. |
| 5,889,945 | A | | 3/1999 | Porter et al. |
| 6,125,115 | A | | 9/2000 | Smits |
| 6,185,565 | B1 | | 2/2001 | Meubus et al. |
| 6,594,693 | B1 | | 7/2003 | Borwankar |
| 6,854,114 | B1 | | 2/2005 | Sexton et al. |
| 6,920,475 | B1 | | 7/2005 | Klots et al. |
| 6,976,055 | B1 | | 12/2005 | Shaffer et al. |
| 7,003,086 | B1 | | 2/2006 | Shaffer et al. |

(Continued)

FOREIGN PATENT DOCUMENTS

WO      WO 03/051027 A1      6/2003

OTHER PUBLICATIONS

M. Handley, et al., RFC2543, SIP: Session Initiation Protocol, Mar. 1999, IETF, p. 1, abstract, p. 7, section 1.1, p. 9, section 1.3, p. 11, section 1.3, p. 13, section 1.4.2, p. 14, sections 1.4.2-1.4.3, p. 15, section 1.4.4, p. 21, section 2, p. 28, section 4.2.1, p. 36, section 5.1, p. 37, section 5.1.1, p. 47, section 6.12.*

(Continued)

*Primary Examiner* — Peling Shaw
(74) *Attorney, Agent, or Firm* — Meyertons, Hood, Kivlin, Kowert & Goetzel, P.C.

(57) ABSTRACT

An instant message is communicated from a controller device to a target device. The instant message includes a command and one or more optional parameters associated with the command. Upon authentication and validation of the instant message and the command (and any optional parameters), the command is executed. The target device generates a second instant message having at least one of a response, a result, and a status associated with at least one of the authentication, validation, and execution. The second instant message is communicated to the controller device. The controller device authenticates the second instant message and validates at least one of the response, the result, and the status. As a particular example, the controller device represents a communication device such as a mobile telephone or personal digital assistant, and the target device represents a media application server capable of supporting one or more communication sessions such as conference calls.

24 Claims, 2 Drawing Sheets

(56) References Cited

U.S. PATENT DOCUMENTS

| | | |
|---|---|---|
| 7,042,879 B2 | 5/2006 | Eschbach et al. |
| 7,177,302 B2 | 2/2007 | Stademann |
| 2002/0161578 A1 | 10/2002 | Saindon et al. |
| 2005/0203677 A1 | 9/2005 | Auger et al. |
| 2005/0206721 A1* | 9/2005 | Bushmitch et al. ........ 348/14.09 |

OTHER PUBLICATIONS

Kumar, Korpi, Sengodon: "IP Telephony with H.323, Architectures for Unified Networks and Integrated Services", Apr. 1, 2001, John Wiley & Sons, Inc., US, XP002302183, pp. 134-142 and pp. 290-298.

Office Action dated Sep. 17, 2008 issued in connection with U.S. Appl. No. 10/610,511.

Office Action dated Feb. 22, 2008 issued in connection with U.S. Appl. No. 10/610,511.

Office Action dated Oct. 12, 2007 issued in connection with U.S. Appl. No. 10/610,511.

Office Action dated Apr. 6, 2007 issued in connection with U.S. Appl. No. 10/610,511.

Office Action as issued by the United States Patent and Trademark Office on Apr. 27, 2009 in connection with U.S. Appl. No. 10/610,511, filed Jun. 30, 2003.

Office Action dated Dec. 9, 2009 in connection with U.S. Appl. No. 10/610,511.

* cited by examiner

APPARATUS, METHOD, AND COMPUTER PROGRAM FOR CONTROLLING A TARGET DEVICE USING INSTANT MESSAGES

CROSS REFERENCE TO RELATED APPLICATIONS

This application is related to U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003, which is incorporated herein by reference.

TECHNICAL FIELD

This disclosure relates generally to control systems and more specifically to an apparatus, method, and computer program for controlling a target device using instant messages.

BACKGROUND

Remote control of computing devices, communication systems, and other devices or systems is becoming increasing popular in the United States and around the world. In a conventional communication system, for example, a user who wishes to control a device in the system typically establishes a communication session with the device and communicates instructions to the device. This allows the user to control the device even when the user is not in proximity to the device being controlled.

SUMMARY

This disclosure provides an apparatus, method, and computer program for controlling a target device using instant messages.

In one aspect, an instant message is received at a target device from a controller device. The instant message includes a command and one or more optional parameters associated with the command. The target device authenticates the instant message and validates at least one of the command and the one or more optional parameters. The target device executes the command in response to authenticating the instant message and validating at least one of the command and the one or more optional parameters.

In a particular aspect, the target device generates and communicates a second instant message to the controller device. The second instant message includes at least one of a response, a result, and a status associated with at least one of the authentication, validation, and execution of the command.

In another particular aspect, the controller device represents a communication device (such as a mobile telephone) used by a user, and the target device represents a media application server capable of supporting one or more communication sessions (such as conference calls).

In another aspect, a controller device generates a first instant message. The first instant message includes a command and one or more optional parameters associated with the command. The controller device communicates the first instant message to a target device and allows the target device to execute the command in the first instant message. The controller device receives from the target device a second instant message. The second instant message includes at least one of a response, a result, and a status associated with the execution of the command.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
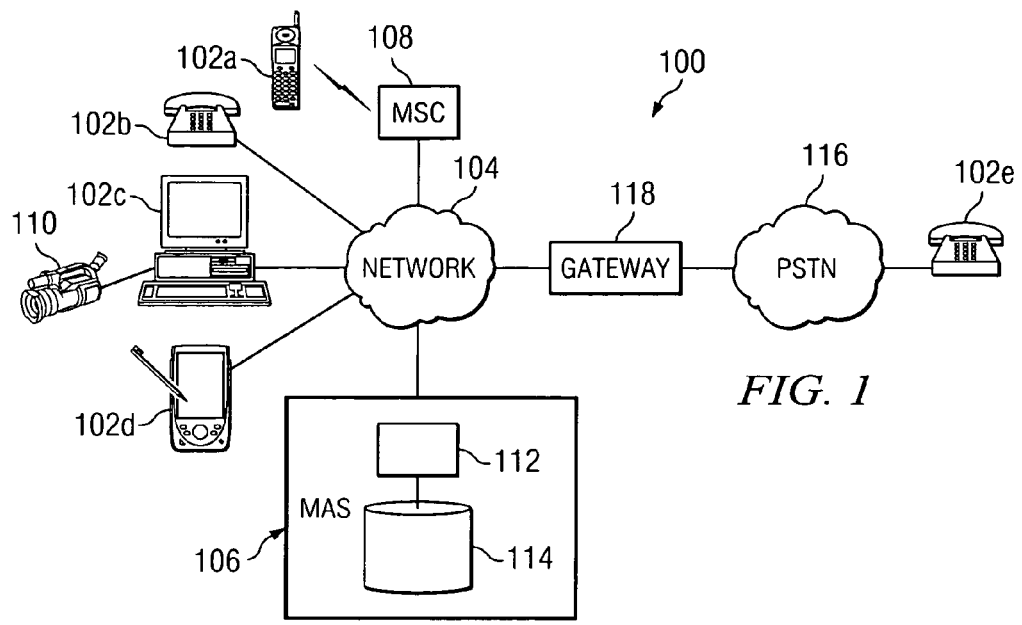
FIG. 1 illustrates an example communication system allowing remote control of a target device according to one embodiment of this disclosure.

FIG. 1 illustrates an example communication system 100 allowing remote control of a target device according to one embodiment of this disclosure. The system 100 shown in FIG. 1 is for illustration only. Other embodiments of the system 100 may be used without departing from the scope of this disclosure.

A problem with conventional conferencing systems and other systems is that it is often difficult or impossible for a person to control a target device without actually establishing a communication session with the target device. For example, it may be difficult for a person to control a conference call without actually joining the conference call.

In the illustrated example, the system 100 includes one or more communication devices 102a-102d, a network 104, and a media application server ("MAS") 106.

The communication devices 102a-102d represent devices used by users or subscribers during communication sessions. Communication sessions represent data conversions or conversations between devices or applications over a network. For example, each of the communication devices 102a-102d represents an input/output device that could include a microphone and a speaker to capture and play audio information. Each of the communication devices 102a-102d could also include a camera and a display to capture and present video information. Each of the communication devices 102a-102d could further represent a portable computing device for sending and receiving text or other messages.

During a communication session, one or more of the devices 102 communicate with the MAS 106 over the network 104. As an example, a communication device 102 may transmit audio information to the MAS 106 and receive audio information from the MAS 106. Each communication device 102 may be constructed or configured from any suitable hardware, software, firmware, or combination thereof for transmitting or receiving audio, video, or other information.

The system 100 shown in FIG. 1 illustrates various embodiments of the communication devices 102. For example, the communication device 102a represents a wireless mobile station that communicates with the network 104 through a mobile switching center ("MSC") 108. The communication device 102b represents a wired Internet Protocol ("IP") telephone that communicates directly with the network 104. An example of a suitable device is an i2004 Internet Telephone, commercially available from Nortel Networks of Brampton, Ontario, Canada. The communication device 102c represents a personal computer, such as a desktop computer or a laptop computer. The communication device 102d represents a wireless device, such as a Blackberry device or personal digital assistant. One or more of these devices 102a-102d may include video functionality, such as when the communication device 102a includes a video camera or when the communication device 102c is coupled to a web camera 110.

While this represents several embodiments of the communication devices 102, other or additional communication devices 102 may be utilized in the system 100 of FIG. 1. By way of illustration in FIG. 1, each of the communication devices 102a-102d is different. It will be understood, however, that the communication devices 102 in the system 100 may include or represent the same or similar type of device or other combination of communication devices.

The network 104 is coupled to the communication devices 102, the MAS 106, and the mobile switching center 108. In this document, the term "couple" refers to any direct or indirect communication between two or more components, whether or not those components are in physical contact with each other. The network 104 facilitates communication between components of the system 100. For example, the network 104 may communicate Internet Protocol ("IP") packets, frame relay frames, Asynchronous Transfer Mode ("ATM") cells, Ethernet, X.25, or other suitable information between network addresses or devices. The network 104 may include one or more local area networks ("LANs"), metropolitan area networks ("MANs"), wide area networks ("WANs"), all or portions of a global network such as the Internet, or any other communication system or systems at one or more locations.

The media application server ("MAS") 106 is coupled to the network 104. The MAS 106 supports communication sessions between communication devices 102 in the system 100. For example, the MAS 106 may receive requests to establish or join a conference call from one or multiple communication devices 102. The MAS 106 may also transmit/receive audio or video information to/from each communication device 102 involved in the conference call.

Figure 2:
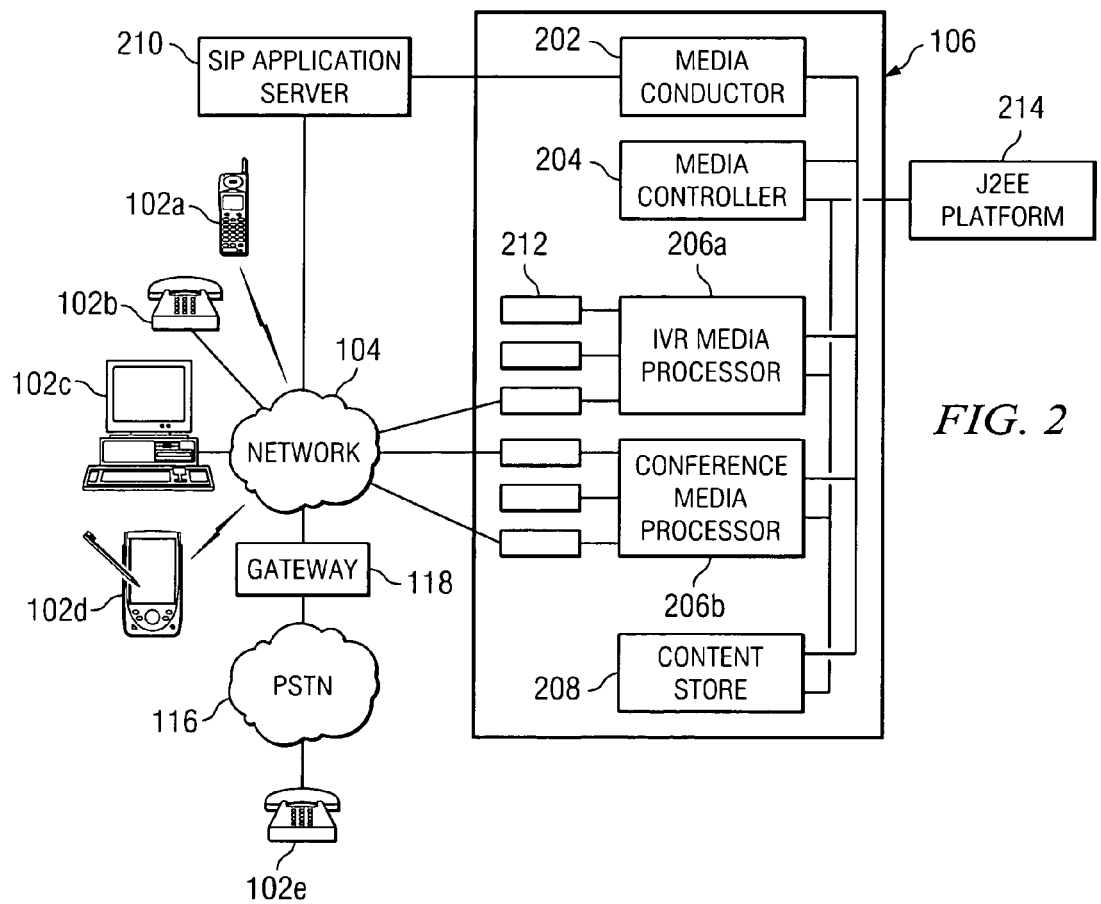
FIG. 2 illustrates an example media application server according to one embodiment of this disclosure.

The MAS 106 may be constructed or configured using hardware, software, firmware, or combination thereof for supporting communication sessions in the system 100. As an example, the MAS 106 could include one or more processors 112 that execute instructions and one or more memories 114 that store instructions and data used by the processors 112. The processor(s) 112 is generally understood to be a device that drives a general-purpose computer. It is noted, however, that other processor devices such as microcontrollers, Field Programmable Gate Arrays (FPGAs), or Application Specific Integrated Circuits (ASICs) can be used as well and achieve the benefits and advantages described herein. An example MAS 106 is shown in FIG. 2, which is described below and in co-pending U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003, and which is incorporated by reference herein.

Communication session(s) established and managed by the MAS 106 can include additional communication devices other than the communication devices 102a-102d. For example, a communication device 102e is shown coupled to the network 104 through a public telephone network, such as a public switched telephone network ("PSTN") 116. The communication device 102e may include a conventional analog or digital telephone or some other type of communication device. In embodiments where the PSTN 116 and the network 104 use different or incompatible protocols to communicate, a gateway 118 may be used that is coupled to the network 104 and the PSTN 116 to facilitate communication between the networks. The gateway 118 functions to translate between the different protocols used by the network 104 and the PSTN 116. Although one PSTN 116 is shown in FIG. 1 coupled to the network 104, other or additional types of public or private networks may be coupled to the network 104.

The communication devices 102 and the MAS 106 could support various standards or protocols used to set up, maintain, and terminate communication sessions between end users. As examples, the communication devices 102 and the MAS 106 could communicate audio, video, or other information using the Realtime Transfer Protocol ("RTP") over User Datagram Protocol ("UDP"), the International Telecommunication Union—Telecommunications ("ITU-T") H.263 standard (video CODEC), the G.711 and G.729 standards (audio CODECs), and other or additional standards or protocols. Other CODECs, such as Moving Picture Experts Group-4 ("MPEG-4"), Digital Video Express ("DIVX"), and Windows Media Video ("WMV"), can be supported by the MAS 106. In addition, signaling messages sent between the communication devices 102 and the MAS 106 may include or conform to the Session Initiation Protocol ("SIP"), which is an application layer protocol for the establishment, modification, and termination of conferencing and telephony sessions over IP-based networks. As will be appreciated, other or additional protocols and configurations may be used.

In one aspect of operation, the MAS 106 includes one or more processes, such as software applications providing an activity, a function, or a systematic sequence of operations that produces a specified result, for handling communication sessions. In this document, the term "participant" refers to a person who joins a communication session, whether or not the person actually participates in the communication session (such as by speaking). A participant could represent a person who joins a communication session for the entirety of the session or for just a portion of the session. To allow conference calls, the MAS 106 supports a conference bridge that allows multiple participants to dial or otherwise contact the bridge and join a conference call. In this document, the phrase "conference call" refers to a communication session that can (but need not) involve more than two participants. A "conference bridge" represents a facility or service that allows participants to be connected together for a conference call. A conference call is typically associated with a "chairperson," who is often responsible for managing the conference call.

During operation, the MAS 106 is controllable using instant messages. The phrase "instant message" refers to a message that is transmitted from a source to a destination for presentation or use at the destination at the time it is received by the destination. In some embodiments, an instant message used to control the MAS 106 includes a command and one or more optional parameters associated with the command. The instant message originates from any suitable source, such as a person using a communication device 102 (whether or not the person is a participant in a communication session) or from a software program capable of remotely controlling the operation of the MAS 106. The instant message includes any suitable contents, including plain text commands and parameters or other contents.

When the MAS 106 receives an instant message, the MAS 106 authenticates the instant message. For example, the MAS 106 authenticates the instant message by identifying the source of the instant message. In some embodiments, the MAS 106 uses any suitable instant messaging security technology to authenticate an instant message. In other embodiments, the source of the instant message encrypts and signs the contents of the instant message, and the MAS 106 authenticates the instant message using the digital signature. Other or additional mechanisms could be used to authenticate the instant messages.

After authenticating the instant message, the MAS 106 validates the command and the one or more optional parameters in the instant message. For example, the MAS 106 validates whether the command in the instant message is a valid command that can be executed by the MAS 106. The MAS 106 also validates whether any parameters included in the instant message are valid parameters. As a particular example, the MAS 106 determines that the command in the instant message is valid if it is one of the following commands:

a START command (starts a conference call by opening a conference bridge);

a STOP command (stops a conference call by closing a conference bridge);

a LOCK command (prevents new participants from joining a conference call);

an UNLOCK command (allows new participants to join a conference call);

a MUTE ALL command (prevents exchange of audio and/or video information from all other participants during a conference call);

a MUTE INDIVIDUALS command (prevents exchange of audio and/or video information from one or more particular participants during a conference call);

a HANGUP INDIVIDUALS command (drops one or more particular participants from a conference call); and a CALL/INVITE INDIVIDUALS command (sends an instant message or other message to one or more particular participants inviting them to join a conference call).

In this particular example, during validation of the command in an instant message, the MAS 106 determines whether the command in the instant message represents one of the commands above. Also, for at least some of these commands (such as START, STOP, LOCK, and UNLOCK), the MAS 106 determines whether a parameter in the instant message identifies a valid conference bridge or a valid conference call. In addition, for at least some of these commands (such as MUTE INDIVIDUALS, HANGUP INDIVIDUALS, and CALL/INVITE INDIVIDUALS), the MAS 106 determines whether one or more parameters in the instant message identify valid participants or other users in the system 100.

Once validated, the MAS 106 executes the command in the instant message. Executing the command may include starting or stopping a conference call, preventing or allowing new participants to join a conference call, preventing exchange of audio and/or video information from at least one participant during a conference call, dropping at least one participant from a conference call, or inviting at least one participant to join a conference call. Executing the command may include invoking, performing, or otherwise supporting any other or additional functions.

After authentication, validation, and/or execution of the command in an instant message, the MAS 106 communicates a second instant message to the user or other source that invoked the command (i.e. sent the first instant message). The second instant message includes any responses, results, and/or status associated with the authentication, validation, or execution of the command. For example, if the MAS 106 fails to authenticate the first instant message or validate the command in the first instant message, the second instant message may include an indication of the failure. If the MAS 106 executes the command in the first instant message, the second instant message may include the responses, results, and/or status of the execution. As particular examples, the second instant message may include (1) text indicating that a conference call was started, stopped, locked, or unlocked successfully or unsuccessfully, (2) text indicating that at least one participant in a conference call has been muted, dropped, or invited successfully or unsuccessfully, and/or (3) other or additional contents.

When the second instant message is received, the communication device 102 or other source of the first instant message authenticates the second instant message and validates the contents of the second instant message. At that point, the communication device 102 or other source of the first instant message may utilize or otherwise respond to the second instant message in any suitable manner. For example, the communication device 102 or other source may record the contents of the second instant message in a log file or display the contents of the second instant message to a user.

As described above, a user using a communication device 102 may receive an instant message (i.e. the second instant message) from the MAS 106 in response to the first instant message containing a command. In some embodiments, an instant message for a particular user is sent to a specific communication device 102 associated with that user. In other embodiments, an instant message for a particular user is sent to some or all communication devices 102 associated with that user. In particular embodiments, such as when the SIP protocol is used in the system 100, a communication device 102 registers with the MAS 106 and is associated with a user. When an instant message is generated for a user, the instant message is sent to all registered communication devices 102 for that user. By communicating the instant message to all registered communication devices 102 for a user, the user may be more likely to receive the instant message on at least one device.

This has described several examples of the contents of various instant messages, such as the particular commands that may be used in an instant message. Instant messages having other or additional contents could also be used without departing from the scope of this disclosure.

Although FIG. 1 illustrates one example of a communication system 100 allowing remote control of a target device according to one embodiment of this disclosure, various changes may be made to FIG. 1. For example, any number of communication devices 102, networks 104, and servers 106 could be used in the system 100. Also, the functionality of the MAS 106, described above as being implemented on a server, could be implemented on any other computing device, such as a desktop computer or a laptop computer. In addition, FIG. 1 illustrates one operational environment in which the various features of the MAS 106 may be used. These features could be implemented in any other suitable operating environment.

FIG. 2 illustrates an example media application server 106 according to one embodiment of this disclosure. The MAS 106 illustrated in FIG. 2 is for illustration only. Other embodiments of the MAS 106 could be used without departing from the scope of this disclosure. Also, while FIG. 2 illustrates the MAS 106 operating in the system 100 of FIG. 1, the MAS 106 may operate in other suitable systems.

In the illustrated example, the MAS 106 includes a media conductor 202, a media controller 204, two media processors ("MPs") 206a-206b, and a content store 208.

The media conductor 202 processes signaling messages received by the MAS 106. In some embodiments, the communication devices 102 communicate the signaling messages directly (or via a gateway, which serves as an entrance/exit into a communications network) to the MAS 106. In other embodiments, the communication devices 102 communicate signaling messages indirectly to the MAS 106, such as when a SIP application server 210 (that received a request from a communication device 102) sends the signaling messages to the media conductor 202 on behalf of the communication device 102. The communication devices 102 may communicate directly with the SIP application server 210 or indirectly through a gateway, such as gateway 118. The media conductor 202 processes the signaling messages and communicates the processed messages to the media controller 204. As particular examples, the media conductor 202 may implement SIP call control, parameter encoding, and media event package functionality.

The media controller 204 manages the operation of the MAS 106 to provide services to the communication devices 102. For example, the media controller 204 may receive processed SIP requests from the media conductor 202, where the requests involve conference or other calls. The controller 204 may then select the media processor 206 to handle each of the calls, support audio/video capability negotiations, enforce licenses controlling how the MAS 106 can be used, and control negotiations based on the licenses. The negotiations could include identifying the CODEC or CODECs to be used to encode and decode audio or video information during a call.

The media processors 206a-206b handle the exchange of audio or video information between communication devices 102 involved in a conference or other call. For example, a media processor 206 could receive audio and video information from one communication device 102 involved in a call, process the information as needed, and forward the information to at least one other communication device 102 involved in the call. The audio and video information may be received through one or more ports 212, which couple the media processors 206 to the network 104. The ports 212 may represent any suitable structure operable to facilitate communication between the MAS 106 and the network 104. In some embodiments, each of the media processors 206 represents a software application for specific media processing, such as interactive voice response ("IVR") media or conference media, which is executed on the MAS 106 hardware platform via the operating system.

In this example embodiment, each media processor 206 provides different functionality in the MAS 106. For example, in some embodiments, the media processor 206a provides IVR functionality in the MAS 106. As particular examples, the media processor 206a supports a voice mail function that can record and play messages or an auto attendant function that provides a menu and directs callers to particular destinations based on their selections. The media processor 206b provides conferencing functionality in the MAS 106, such as by facilitating the exchange of audio and video information between communication devices 102.

The content store 208 provides access to content used by the various components of the system 100. For example, in some embodiments, the content store 208 provides access to stored voice mail messages and access codes used to initiate or join conference calls. The content store 208 may also provide access to any other or additional information. In other embodiments, the content store 208 is replaced by a conventional database or other data storage facility.

A Java 2 Enterprise Edition ("J2EE") platform 214 is coupled to the MAS 106. The J2EE platform 214 allows the MAS 106 to retrieve additional information used to provide subscriber services in the system 100. For example, the J2EE platform 214 may provide audio announcements used by the IVR media processor 206a. The J2EE platform 214 represents one possible apparatus used to provide audio or other information to the MAS 106. Any other or additional device or apparatus may be used to provide the information to the MAS 106.

In a particular embodiment, various components of the MAS 106 represent software processes executed by the processor(s) 112 of the MAS 106. While the components have been described as being executed by a MAS 106, the software processes could be executed by other computing devices such as a desktop computer. In other embodiments, the various components of the MAS 106 may be implemented in other ways, such as in hardware.

In some embodiments, the MAS 106 receives an instant message that includes a command to be executed by the MAS 106. The media conductor 202 receives the instant message (either directly from a communication device 102 or other source or indirectly through the SIP application server 210 or other source) and provides at least the contents of the instant message to the media controller 204. The media controller 204 or one of the media processors 206a-206b authenticates the instant message and validates the command in the instant message. Depending on the command to be executed, the media controller 204 executes the command or passes the command to one of the media processors 206a-206b for execution.

Upon authentication, validation, or execution, the media controller 204 generates another instant message having the responses, results, and/or status of the authentication, validation, and/or execution. The media controller 204 then sends the second instant to the source of the first instant message through the media conductor 202. The source of the first instant message receives the second instant message from the media conductor 202, authenticates the second instant message, and validates the contents of the second instant message.

To facilitate the use of instant messages in the system 100, when a communication device 102 registers with the MAS 106, the communication device 102 informs the MAS 106 whether the communication device 102 is capable of receiving instant messages. In this way, the MAS 106 identifies which communication devices 102 are capable of communicating and receiving instant messages. This information may be useful, for example, during authentication of an instant message.

As a particular example of this remote control functionality, the MAS 106 may typically open a conference bridge when the chairperson of a conference call joins the conference bridge. For a particular conference call, the chairperson of the conference call may be running late, but several other participants may have already joined the conference bridge. The chairperson could use a communication device 102 to send an instant message to the MAS 106, where the instant message includes a command opening the conference bridge. The MAS 106 may then open the conference bridge and allow the conference call to begin, even though the chairperson has not actually joined the conference call. In this example, the chairperson is able to open the conference bridge without actually establishing a voice connection with the conference bridge.

Although FIG. 2 illustrates one example of a media application server 106, various changes may be made to FIG. 2.

For example, any number of media processors 206 could be used in the MAS 106. Also, the functional divisions shown in FIG. 2 are for illustration only. Various components can be combined or omitted or additional components can be added according to particular functional designations or needs. In addition, while the components 202-208 have been described as being executed by a server, the components 202-208 may be executed by other hardware platforms, such as a desktop computer or a laptop computer.

Figure 3:
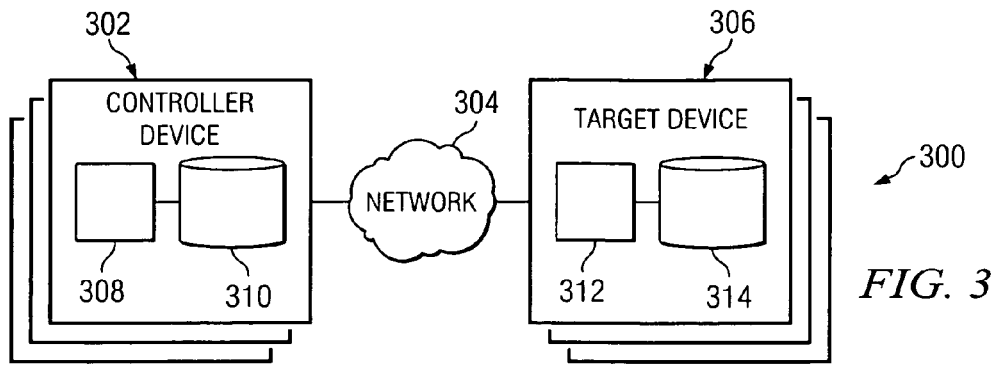
FIG. 3 illustrates a generic system for remote control of a target device according to one embodiment of this disclosure.

FIG. 3 illustrates a generic system 300 for remote control of a target device according to one embodiment of this disclosure. The system 300 shown in FIG. 3 is for illustration only. Other embodiments of the system 300 may be used without departing from the scope of this disclosure.

In the illustrated example, the system 300 includes one or more controller devices 302, a network 304, and one or more target devices 306. The network 304 may be the same as or similar to the network 104 of FIG. 1.

Each controller device 302 represents any suitable device capable of controlling one or more target devices 306 using instant messaging. The controller device 302 could, for example, represent an instant message-capable communication device 102 of FIG. 1. The controller device 302 could also represent a device executing a program capable of controlling one or more target devices 306. The controller device 302 includes any hardware, software, firmware, or combination thereof for controlling one or more target devices 306 using instant messages. In this example, the controller device 302 includes one or more processors 308 that execute instructions and one or more memories 310 that store instructions and data used by the processors 308, although other embodiments of the controller device 302 may be used.

Each target device 306 represents any suitable device capable of being controlled by one or more controller devices 302 using instant messaging. The target device 306 could, for example, represent the MAS 106 of FIG. 1. The target device 306 could also represent an oil pump or any other device, system, or part thereof capable of being controlled remotely. The target device 306 includes any hardware, software, firmware, or combination thereof capable of being controlled by one or more controller devices 302 using instant messages. In this example, the target device 306 includes one or more processors 312 that execute instructions and one or more memories 314 that store instructions and data used by the processors 312, although other embodiments of the target device 306 may be used.

As described above with respect to FIG. 1, each controller device 302 is capable of controlling a target device 306 using instant messages. An instant message includes a command and optionally one or more parameters. A target device 306 receives an instant message from a controller device 302, authenticates the instant message, and validates the command and any parameters in the instant message. The target device 306 executes the command, generates a second instant message that includes the responses, results, and/or status of the execution, and communicates the second instant message to the controller device 302. The controller device 302 receives the second instant message, authenticates the second instant message, and validates the contents of the second instant message. In this way, the target device 306 is controlled remotely from any location using instant messaging.

In some embodiments, a controller device 302 is capable of controlling a single target device 306 or multiple target devices 306. Also, in some embodiments, a single target device 306 is capable of being controlled by a single controller device 302 or multiple controller devices 302. When a controller device 302 is capable of controlling multiple target devices 306, the controller 302 could control the target devices 306 individually (with separate instant messages) or collectively (with a single instant message). The system 300 may use any suitable technique to supply a single instant message from a controller device 302 to multiple target devices 306. In particular embodiments, a chat room that each target device 306 is capable of accessing can be used to supply a single instant message to multiple target devices 306.

Although FIG. 3 illustrates one example of a generic system 300 for remote control of a target device, various changes may be made to FIG. 3. For example, any number of controller devices 302, networks 304, and target devices 306 could be used in the system 300.

Figure 4:
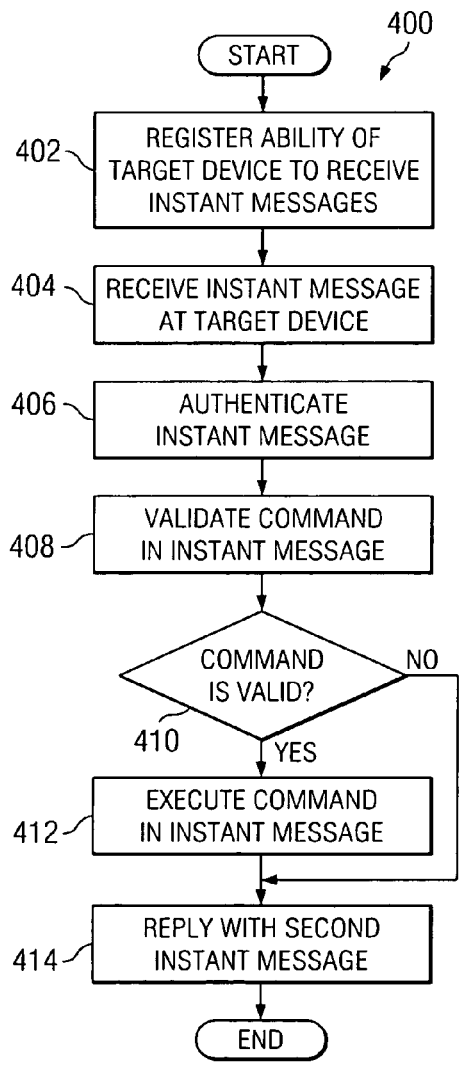
FIG. 4 illustrates an example method for allowing remote control at a target device according to one embodiment of this disclosure.

FIG. 4 illustrates an example method 400 for allowing remote control at a target device according to one embodiment of this disclosure. For ease of illustration and explanation, the method 400 is described with respect to the system 300 of FIG. 3. The method 400 could be used by any other suitable device and in any other suitable system, such as when the MAS 106 of FIG. 2 is controlled in the system 100 of FIG. 1.

A target device 306 registers its ability to receive instant messages at step 402. Registration may include, for example, the target device 306 informing one or more of the controller devices 302 or a network manager during a registration process that the target device 306 is capable of receiving instant messages. Registration may also include the target device 306 sending a message to a specific one of the controller devices 302 or broadcasting its presence to multiple controller devices 302.

The target device 306 receives an instant message having a command at step 404. The instant message may also include one or more parameters associated with the command.

The target device 306 authenticates the instant message at step 406. Authentication may include, for example, the target device 306 using any suitable instant messaging security technology to authenticate the instant message. Authentication may also include the target device 306 using a digital signature associated with the instant message to authenticate the instant message.

The target device 306 validates the contents of the instant message at step 408. Validation may include, for example, the target device 306 determining whether a command in the instant message represents a valid command that can be executed by the target device 306. Validation may also include the target device 306 determining whether one or more parameters associated with the command are valid parameters. If the contents of the instant message are encrypted, the target device 306 may decrypt the target device 306 before validating the contents of the instant message.

The target device 306 determines whether a valid command has been received at step 410. This determination may include, for example, determining whether the instant message was successfully authenticated and the command in the instant message was successfully validated.

If the command is valid, the target device 306 executes the command at step 412. Execution may include, for example, the target device 306 performing any function associated with the received command.

When execution is complete or when the command is invalid, the target device 306 generates and sends a second instant message at step 414. The second instant message could, for example, indicate that the received command was invalid because it could not be authenticated or validated. The second instant message could also include an indication that execution of the command was attempted and failed for a specified reason. The second instant message could further include an indication that execution of the command was successful and provide the responses, results, and/or status of that execution.

Although FIG. 4 illustrates one example of a method 400 for allowing remote control at a target device, various changes may be made to FIG. 4. For example, the target device 306 could optionally decrypt the contents of the first instant message before authentication or validation and encrypt the contents of the second instant message before transmission.

Figure 5:
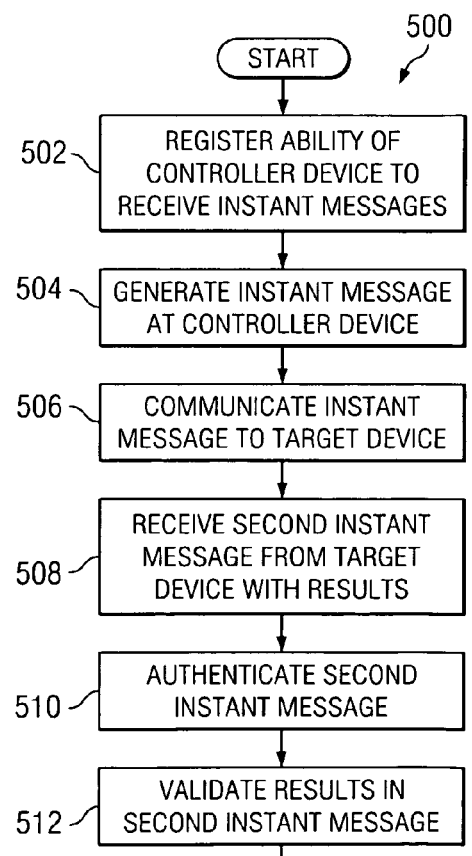
FIG. 5 illustrates an example method for controlling a target device from a controller device according to one embodiment of this disclosure.

FIG. 5 illustrates an example method 500 for controlling a target device from a controller device according to one embodiment of this disclosure. For ease of illustration and explanation, the method 500 is described with respect to the system 300 of FIG. 3. The method 500 could be used by any other suitable device and in any other suitable system, such as when a communication device 102 in the system 100 of FIG. 1 is used to control the MAS 106.

A controller device 302 registers its ability to receive instant messages at step 502. Registration may include, for example, the controller device 302 informing other controller devices 302 or a network manager during a registration process that the controller device 302 is capable of receiving instant messages.

The controller device 302 generates an instant message having a command at step 504. The command could request execution or performance of any suitable function. The command may or may not have one or more associated parameters used during execution or performance of the function. The controller device 302 communicates the instant message to a target device 306 at step 506.

At this point, the target device 306 receives the instant message and attempts to execute the command. In response, the controller device 302 receives a second instant message having the execution responses, results, and/or status from the target device at step 508. The responses, results, and/or status may indicate that the first instant message could not be authenticated, the command in the first instant message could not be validated, execution of the command failed, or execution of the command was successful.

To ensure that the second instant message is a valid message, the controller device 302 authenticates the second instant message at step 510. The controller device 302 also validates the contents of the second instant message at step 512. After that, the controller device 302 utilizes or otherwise responds to the contents of the second instant message in any suitable manner. For example, the controller device 302 could log the contents or display the contents to a user.

Although FIG. 5 illustrates one example of a method 500 for controlling a target device at a controller device, various changes may be made to FIG. 5. For example, the controller device 302 could optionally encrypt the contents of the first instant message before transmission and decrypt the contents of the second instant message before authentication or validation.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for controlling a target device by a controller device, the method comprising:
   receiving at the target device from the controller device an instant message comprising a command and one or more optional parameters associated with the command, wherein the command is related to a videoconference, wherein the target device is associated with the videoconference, wherein the command comprised in content of the instant message, wherein the command is specified by user input, and wherein the command is one of:
      a command to lock the videoconference from new participants in the videoconference; or
      a command to unlock the videoconference for new participants in the videoconference;
   authenticating the instant message;
   validating at least one of the command and the one or more optional parameters; and
   executing the command in response to authenticating the instant message and validating at least one of the command and the one or more optional parameters, wherein, in response to the command to lock the videoconference from new participants in the videoconference, new participants are not allowed to join the videoconference, and wherein, in response to the command to unlock the videoconference for new participants in the videoconference, new participants are allowed to join the videoconference.

2. The method of claim 1, wherein:
   the controller device comprises a communication device used by a user; and
   the target device comprises a media application server, the media application server capable of supporting one or more communication sessions.

3. The method of claim 1, further comprising generating and communicating a second instant message to the controller device, the second instant message comprising at least one of a response, a result, and a status associated with at least one of the authentication, the validation, and the execution.

4. The method of claim 1, wherein validating the command comprises:
   determining whether the command is a valid command; and
   determining whether the one or more parameters identifies one of a valid conference bridge and valid conference call.

5. An apparatus capable of being controlled by a controller device, the apparatus comprising:
   a port operable to facilitate receipt of an instant message from the controller device, the instant message comprising a command and one or more optional parameters associated with the command, wherein the command is related to a videoconference, wherein the apparatus is associated with the videoconference, wherein the command comprised in content of the instant message, wherein the command is specified by user input, and wherein the command is one of:
      a command to lock the videoconference from new participants in the videoconference; or
      a command to unlock the videoconference for new participants in the videoconference; and one or more processors collectively operable to:
  authenticate the instant message;
  validate at least one of the command and the one or more optional parameters;
  execute the command in response to authenticating the instant message and validating at least one of the command and the one or more optional parameters, wherein, in response to the command to lock the videoconference from new participants in the videoconference, new participants are not allowed to join the videoconference, and wherein, in response to the command to unlock the videoconference for new participants in the videoconference, new participants are allowed to join the videoconference.

6. The apparatus of claim 5, wherein:
the controller device comprises a communication device used by a user; and
the apparatus comprises a media application server, wherein the one or more processors collectively comprise:
  a media conductor capable of receiving signaling messages, at least some of which are related to communication sessions;
  a media controller capable of managing operation of the media application server; and
  a plurality of media processors capable of supporting the communication sessions.

7. The apparatus of claim 5, wherein the one or more processors are further collectively operable to generate and communicate a second instant message to the controller device, the second instant message comprising at least one of a response, a result, and a status associated with at least one of the authentication, the validation, and the execution.

8. A computer program embodied on a computer readable storage medium and operable to be executed by a processor, wherein the computer program causes a target device to be controlled by a controller device, the computer program comprising computer readable program code for:
  receiving at the target device from the controller device an instant message comprising a command and one or more optional parameters associated with the command, wherein the command is related to a videoconference, wherein the target device is associated with the videoconference, wherein the command comprised in content of the instant message, wherein the command is specified by user input, and wherein the command is one of:
    a command to lock the videoconference from new participants in the videoconference; or
    a command to unlock the videoconference for new participants in the videoconference;
  authenticating the instant message;
  validating at least one of the command and the one or more optional parameters; and
  executing the command in response to authenticating the instant message and validating at least one of the command and the one or more optional parameters, wherein, in response to the command to lock the videoconference from new participants in the videoconference, new participants are not allowed to join the videoconference, and wherein, in response to the command to unlock the videoconference for new participants in the videoconference, new participants are allowed to join the videoconference.

9. The computer program of claim 8, wherein:
the controller device comprises a communication device used by a user; and
the target device comprises a media application server, the media application server capable of supporting one or more communication sessions.

10. The computer program of claim 9, wherein the media application server comprises:
  a media conductor capable of receiving signaling messages, at least some of which are related to the communication sessions;
  a media controller capable of managing operation of the media application server; and
  a plurality of media processors capable of supporting the communication sessions.

11. The computer program of claim 8, further comprising computer readable program code for generating and communicating a second instant message to the controller device, the second instant message comprising at least one of a response, a result, and a status associated with at least one of the authentication, the validation, and the execution.

12. A method for controlling a target device by a controller device, the method comprising:
  generating at the controller device a first instant message comprising a command and one or more optional parameters associated with the command, wherein the command is related to a videoconference, wherein the target device is associated with the videoconference, wherein the command comprised in content of the instant message, wherein the command is specified by user input, and wherein the command is one of:
    a command to lock the videoconference from new participants in the videoconference; or
    a command to unlock the videoconference for new participants in the videoconference;
  communicating the first instant message to the target device;
  allowing the target device to execute the command in the first instant message, wherein the target device is configured to authenticate the instant message and validate at least one of the command and the one or more optional parameters, wherein, in response to the command to lock the videoconference from new participants in the videoconference, new participants are not allowed to join the videoconference, and wherein, in response to the command to unlock the videoconference for new participants in the videoconference, new participants are allowed to join the videoconference; and
  receiving from the target device a second instant message comprising at least one of a response to the command, a result, and a status associated with the command.

13. The method of claim 12, wherein:
the controller device comprises a communication device used by a user; and
the target device comprises a media application server, the media application server capable of supporting one or more communication sessions.

14. The method of claim 13, wherein the media application server comprises:
  a media conductor capable of receiving signaling messages, at least some of which are related to the communication sessions;
  a media controller capable of managing operation of the media application server; and
  a plurality of media processors capable of supporting the communication sessions.

15. The method of claim 12, further comprising:
  authenticating the second instant message; and
  validating at least one of the response, the result, and the status in the second instant message.

16. An apparatus capable of controlling a target device, the apparatus comprising:
- a port operable to facilitate communication of a first instant message to the target device, the instant message comprising a command and one or more optional parameters associated with the command, wherein the command is related to a videoconference, wherein the target device is associated with the videoconference, wherein the command comprised in content of the instant message, wherein the command is specified by user input, and wherein the command is one of:
  - a command to lock the videoconference from new participants in the videoconference; or
  - a command to unlock the videoconference for new participants in the videoconference; and
- one or more processors collectively operable to:
  - generate the first instant message;
  - communicate the first instant message to the target device, wherein the target device is configured to authenticate the instant message and validate at least one of the command and the one or more optional parameters, wherein, in response to the command to lock the videoconference from new participants in the videoconference, new participants are not allowed to join the videoconference, and wherein, in response to the command to unlock the videoconference for new participants in the videoconference, new participants are allowed to join the videoconference; and
  - receive from the target device a second instant message comprising at least one of a response to the command, a result, and a status associated with the command.

17. The apparatus of claim 16, wherein:
the apparatus comprises a communication device used by a user; and
the target device comprises a media application server, the media application server comprising:
- a media conductor capable of receiving signaling messages, at least some of which are related to communication sessions;
- a media controller capable of managing operation of the media application server; and
- a plurality of media processors capable of supporting the communication sessions.

18. The apparatus of claim 16, wherein the one or more processors are further collectively operable to:
authenticate the second instant message; and
validate at least one of the response, the result, and the status in the second instant message.

19. A computer program embodied on a computer readable storage medium and operable to be executed by a processor, wherein the computer program causes a target device to be controlled by a controller device, the computer program comprising computer readable program code for:
- generating at the controller device a first instant message comprising a command and one or more optional parameters associated with the command, wherein the command is related to a videoconference, wherein the target device is associated with the videoconference, wherein the command comprised in content of the instant message, wherein the command is specified by user input, and wherein the command is one of:
  - a command to lock the videoconference from new participants in the videoconference; or
  - a command to unlock the videoconference for new participants in the videoconference;
- communicating the first instant message to the target device, wherein the target device is configured to authenticate the instant message and validate at least one of the command and the one or more optional parameters, wherein, in response to the command to lock the videoconference from new participants in the videoconference, new participants are not allowed to join the videoconference, and wherein, in response to the command to unlock the videoconference for new participants in the videoconference, new participants are allowed to join the videoconference;
- receiving from the target device a second instant message comprising at least one of a response to the command, a result, and a status associated with the command.

20. The computer program of claim 19, wherein:
the controller device comprises a communication device used by a user; and
the target device comprises a media application server, the media application server capable of supporting one or more communication sessions.

21. The computer program of claim 20, wherein the media application server comprises:
- a media conductor capable of receiving signaling messages, at least some of which are related to the communication sessions;
- a media controller capable of managing operation of the media application server; and
- a plurality of media processors capable of supporting the communication sessions.

22. The computer program of claim 19, further comprising computer readable program code for:
authenticate the second instant message; and
validate at least one of the response, the result, and the status in the second instant message.

23. The method of claim 1, wherein the command is separate from signaling messages associated with the videoconference.

24. The method of claim 1, wherein the controller device is not included in the videoconference.

* * * * *